United States Patent
Wilson et al.

(10) Patent No.: US 11,300,986 B2
(45) Date of Patent: Apr. 12, 2022

(54) CURRENT BALANCING

(71) Applicant: Hamilton Sundstrand Corporation, Charlotte, NC (US)

(72) Inventors: Michael A. Wilson, Scottsdale, AZ (US); Steven A. Avritch, Bristol, CT (US); Gary L. Hess, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/175,583

(22) Filed: Feb. 12, 2021

(65) Prior Publication Data

US 2021/0263543 A1    Aug. 26, 2021

Related U.S. Application Data

(63) Continuation-in-part of application No. 16/800,305, filed on Feb. 25, 2020, now Pat. No. 11,128,132.

(51) Int. Cl.

| G05F 1/46 | (2006.01) |
|---|---|
| B64D 41/00 | (2006.01) |
| H02J 1/10 | (2006.01) |
| G05F 1/595 | (2006.01) |
| G05F 1/575 | (2006.01) |

(52) U.S. Cl.
CPC .............. *G05F 1/46* (2013.01); *B64D 41/00* (2013.01); *G05F 1/575* (2013.01); *G05F 1/595* (2013.01); *H02J 1/106* (2020.01); *H02J 1/108* (2013.01); *B64D 2221/00* (2013.01)

(58) Field of Classification Search
CPC .... H02J 1/10; H02J 1/102; H02J 1/106; H02J 1/108; H02J 2310/44; G05F 1/59; G05F 1/575; G05F 1/565
See application file for complete search history.

(56) References Cited

U.S. PATENT DOCUMENTS

| 5,253,155 | A | 10/1993 | Yamamoto |
|---|---|---|---|
| 6,177,783 | B1 | 1/2001 | Donohue |
| 7,355,829 | B2 | 4/2008 | Yamamura et al. |
| 7,466,573 | B2 | 12/2008 | Kojori et al. |
| 8,022,654 | B2 | 9/2011 | Zhao et al. |
| 8,853,885 | B2 | 10/2014 | Umminger et al. |
| 9,281,761 | B2 | 3/2016 | Wagoner et al. |
| 9,343,991 | B2 | 5/2016 | Wagoner et al. |
| 9,413,170 | B2 | 8/2016 | Henkel et al. |
| 9,705,325 | B2 | 7/2017 | Dwelley |
| 9,733,282 | B2 | 8/2017 | Schrom et al. |

(Continued)

*Primary Examiner* — Ryan Johnson
(74) *Attorney, Agent, or Firm* — Locke Lord LLP; Joshua L. Jones; Gabrielle L. Gelozin

(57) ABSTRACT

A system comprises a first current balancer and a second current balancer. Each of the first and second current balancers includes a first input line for a first voltage source connected to a first output, a second input line for a second voltage source connected to a second output and is in parallel with the first input line, a first series pass element connected in series with the first input line, and a second series pass element connected in series with the second input line. The system further includes a controller operatively connected to the first series pass element and to the second series pass element to throttle at least one of the first series pass element and the second series pass element to balance output current in the first and second outputs.

20 Claims, 7 Drawing Sheets

(56) References Cited

U.S. PATENT DOCUMENTS

| | | | |
|---|---|---|---|
| 9,991,778 B2 | 6/2018 | Krolak et al. | |
| 10,454,393 B2 | 10/2019 | Paschedag et al. | |
| 10,476,266 B2 | 11/2019 | Gurlahosur et al. | |
| 10,644,612 B2 | 5/2020 | Soto et al. | |
| 2010/0164452 A1* | 7/2010 | Ruan | H04L 12/10 |
| | | | 323/282 |
| 2017/0250604 A1* | 8/2017 | Ouyang | H02H 9/004 |

* cited by examiner

CURRENT BALANCING

CROSS-REFERENCE TO RELATED APPLICATIONS

This application is a continuation-in-part of U.S. patent application Ser. No. 16/800,305, filed Feb. 25, 2020, the content of which are incorporated herein in its entirety.

BACKGROUND

1. Field

The present disclosure relates to power supplies, and more particularly to direct current power supplies such as 28 Volt direct current (VDC) power supplies for safety sensitive aerospace avionics applications.

2. Description of Related Art

Many avionics controls require multiple 28 VDC voltage inputs for redundancy. The redundant voltage inputs are typically "OR-ed" together (using diodes or an active-circuit equivalent) to allow the system to function in the event that one of the voltage inputs is unavailable. Under certain circumstances, input current can be drawn solely from a single one of the voltage inputs even when multiple are available. Specifically, when multiple power sources are utilized to power an avionics application, the power sources are not regulated to the exact same voltage level. Even slight differences in voltage between multiple redundant voltage sources can result in a large imbalance of current where the vast majority of current is drawn from the source with the higher voltage. This has the effect of driving an increase in the requirement for the maximum current capabilities of the 28 VDC voltage supplies and harness wiring, since equal distribution of current cannot be guaranteed.

The conventional techniques have been considered satisfactory for their intended purpose. However, there is an ever present need for improved systems and methods for power supplies such as for avionics. This disclosure provides a solution for this need.

SUMMARY

A system comprises a first current balancer; and a second current balancer. Each of the first and second current balancers includes a first input line for a first voltage source connected to a first output; a second input line for a second voltage source connected to a second output and is in parallel with the first input line, a first series pass element connected in series with the first input line, and a second series pass element connected in series with the second input line. The system further includes a controller operatively connected to the first series pass element and to the second series pass element to throttle at least one of the first series pass element and the second series pass element to balance output current in the first and second outputs, the outputs of the first current balancer are both connected to the first input line of the second current balancer for balancing the first and second input lines of the first current balancer with the second input line of the second current balancer.

The system can include a third current balancer which can also include a first input line for a first voltage source connected to a first output, a second input line for a second voltage source connected to a second output and is in parallel with the first input line, a first series pass element connected in series with the first input line, and a second series pass element connected in series with the second input line.

The third current balancer can include a controller operatively connected to the first series pass element and to the second series pass element to throttle at least one of the first series pass element and the second series pass element to balance output current in the first and second outputs. The outputs of the third current balancer can be both connected to the second input line of the second current balancer for balancing the first and second input lines of the first current balancer with the first and second input lines of the third current balancer.

The first and second current balancers can be two in a plurality of current balancers. Each current balancer in the plurality of current balancers can include a first input line for a first voltage source connected to a first output, a second input line for a second voltage source connected to a second output and is in parallel with the first input line, a first series pass element connected in series with the first input line, and a second series pass element connected in series with the second input line. Each current balancer in the plurality of current balancers can also include a controller operatively connected to the first series pass element and to the second series pass element to throttle at least one of the first series pass element and the second series pass element to balance output current in the first and second outputs. The plurality of current balancers can be connected together in a cascade to balance the first input lines of a sub-plurality of the plurality of current balancers.

The system can include an odd number of current balancers, and an even number of input lines balanced onto a single output. It is also contemplated that the system can include an even number of current balancers, and an odd number of input lines balanced onto a single output.

At least one of the current balancers can further include a first current sensor connected in series in the first line between the first series pass element and the first output, the first current sensor can operatively connected to the controller to provide feedback to the controller regarding current measured in the first line. At least one of the current balancers can further include a second current sensor connected in series in the second line between the second series pass element and the second output. The second current sensor can be operatively connected to the controller to provide feedback to the controller regarding current in the second line.

At least one of the current balancers can include a difference amplifier connected to receive input from each of the first and second current sensors, and connected to provide an output to the controller that is proportional to difference in current between the first and second current sensors. At least one of the current balancers can also include a difference amplifier connected between the controller and the first series pass element for controlling the first series pass element. The difference amplifier can be connected to a bias voltage so the difference amplifier can compare between the output of the controller and the bias voltage to control the first series pass element.

At least one of the current balancers can include a summing amplifier connected between the controller and the second series pass element for controlling the second series pass element. The summing amplifier can be connected to a bias voltage so the summing amplifier can compare between the output of the controller and the bias voltage to control the second series pass element.

At least one of the current balancers can include a diode or-ing operatively connected to each of the first and second outputs and configured to output a single voltage from the first and second lines. The diode or-ing can have a first Schottky diode connected to the first output and a second Schottky diode connected to the second output. At least one of the current balancers and each of the first and second series pass elements can include a respective p-channel MOSFET as a primary pass element. In at least one of the current balancers the controller can be a proportional integral (PI) controller.

A method comprises balancing an output current between at least a first input line, a second input line, and a third input line. Balancing output current includes throttling current in at least one of a first series pass element, second series pass element, and/or a third series pass element connected in series with the first input line, the second input line, and third input line, respectively. Balancing output current can be performed within a response time configured to avoid tripping a breaker. The method can also include maintaining the output current at 28 VDC.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
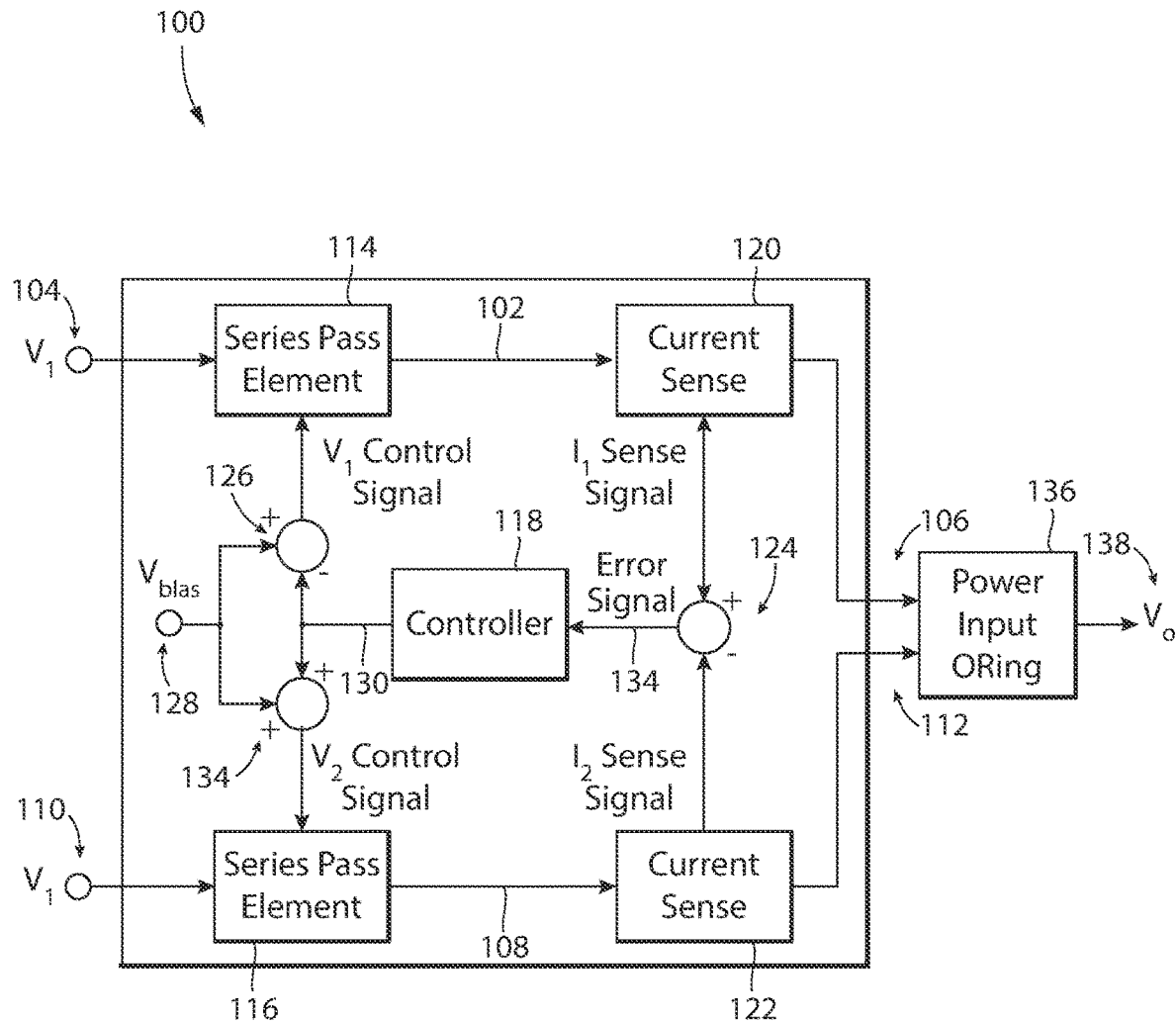
FIG. 1 is a schematic view of an embodiment of a system constructed in accordance with the present disclosure, showing the first and second lines.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used for current balancing, e.g. where multiple redundant 28 VDC voltage sources are used in avionics applications.

A system 100 includes a first input line 102 for connecting to a first voltage source 104, The first input line 102 is connected to a first output 106. A second input line 108 is included for connecting to a second voltage source 110. The second input line 108 is connected to a second output 112 and is in parallel with the first input line 102. A first series pass element 114 is connected in series with the first input line 102, and a second series pass element 116 is connected in series with the second input line 108. A controller 118 is operatively connected to the first series pass element 114 and to the second series pass element 116 to throttle the first series pass element 114 and/or the second series pass element 116 to balance output current in the first and second outputs 106, 112.

A first current sensor 120 is connected in series in the first line 102 between the first series pass element 114 and the first output 106. The first current sensor 120 is operatively connected to the controller 118 to provide feedback to the controller 118 regarding current in the first line 102. A second current sensor 122 is connected in series in the second line 108 between the second series pass 116 element and the second output 112. The second current sensor 122 is operatively connected to the controller 118 to provide feedback to the controller regarding current in the second line 108. A difference amplifier 124 is connected to receive input from each of the first and second current sensors 120, 122, and can be connected to provide output as an error signal to the input line 132 of the controller 118 proportional to difference in current between the first and second current sensors 120, 122.

A difference amplifier 126 connects between the output 130 of the controller 118 and the first series pass element 114 for controlling the first series pass element 114. The difference amplifier 126 is connected to a bias voltage 128 so the difference amplifier 126 can compare between output of the controller 118 and the bias voltage 128 to control the first series pass element 114. The purpose of the bias voltage is to ensure that at least one of the series pass elements remains turned on, i.e. not throttled. This is to avoid the degenerate case where both currents are balanced, e.g., at zero. A summing amplifier 134 connects between the controller 118 and the second series pass element 116 for controlling the second series pass element 116. The summing amplifier 134 is connected to the bias voltage 128 so the summing amplifier 134 can compare between output of the controller 118 and the bias voltage 128 to control the second series pass element 116.

Figure 2:
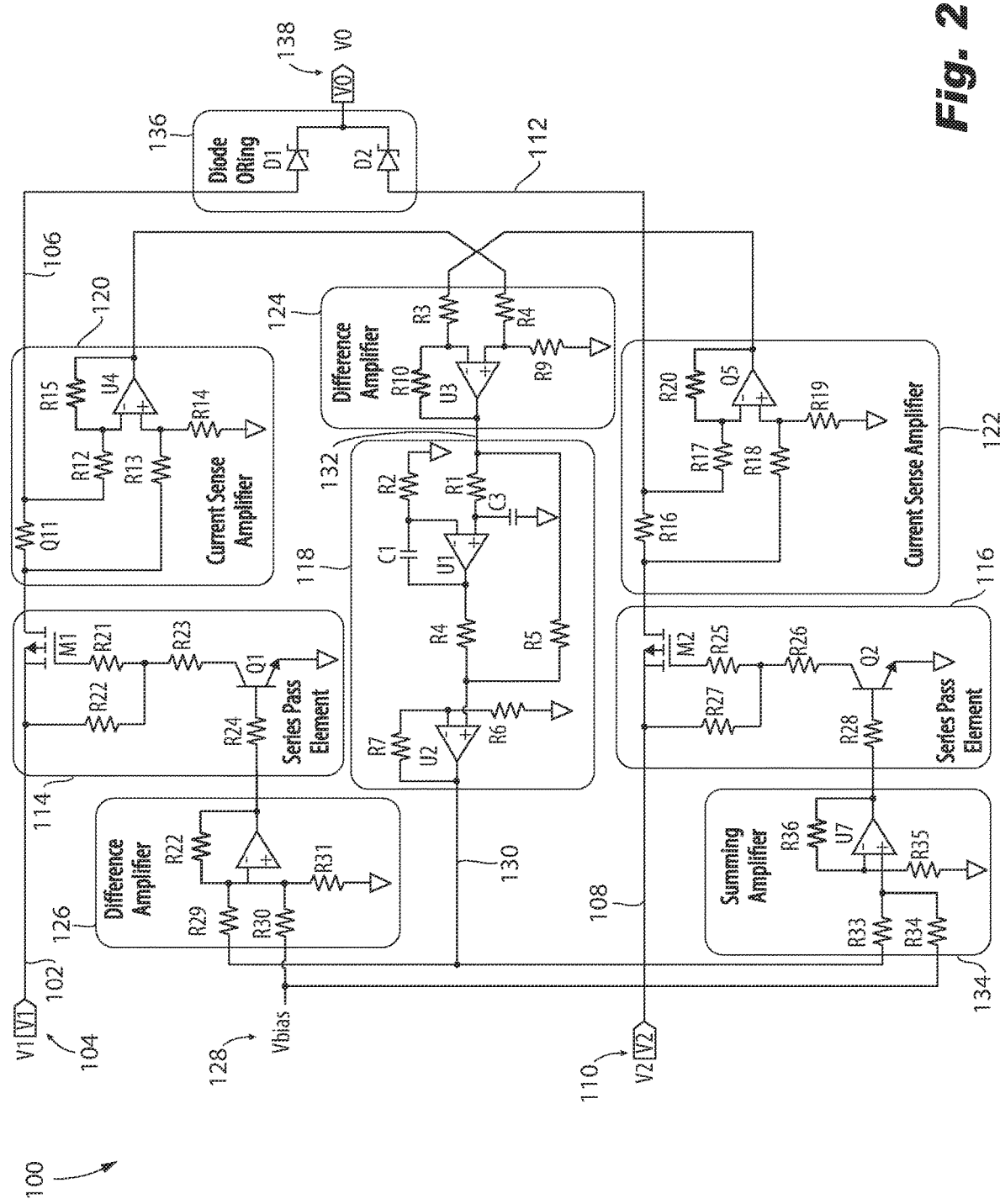
FIG. 2 is a schematic view of the system of FIG. 1, showing the circuit elements of individual components from FIG. 1.

With reference now to FIG. 2, a diode or-ing 136 is operatively connected to each of the first and second outputs 106, 112 and is configured to output a single voltage 138 from the first and second lines 102, 108. The diode or-ing 136 includes a respective Schottky diode D1, D2 connected to each of the first and second outputs 106, 112, and to the single output voltage 138. Those skilled in the art will readily appreciate that any other suitable type of diode isolation can be implemented without departing from the scope of this disclosure such as a diode isolation function that could be implemented with actual diodes, ideal diode circuitry, similar circuitry that implements the isolation function of a simple diode, or the like.

Each of the first and second series pass elements 114, 116 includes a respective p-channel MOSFET M1, M2 as the primary pass element for throttling current in the respective line 102, 108. Each of the first and second series pass elements 114, 116 includes a respective set of resistors R21, R22, R23 and R25, R26, R27, and respective grounded transistor Q1, Q2 connected as shown in FIG. 2. Those skilled in the art will readily appreciate that there are other discrete circuit instantiations that can perform the same functions as the elements of the first and second series pass elements 114, 116 described above without departing from the scope of the invention.

Each of the difference amplifiers, 124, 126 includes respective resistors R3, R8, R9, R10, and R29, R30, R31, R32 and a respective operational amplifier (op-amp) U3, U6 connected as shown in FIG. 2, including grounding connections. The summing amplifier 134 includes resistors R33, R34, R35, R36 and an operational amplifier U7 connected as shown in FIG. 2, including the grounding connection. Each of the current sensors 120, 122 can be a current sense amplifier, including the respective resistors R11, R12, R13, R14, R15 and R16, R17, R18, R19, R20 and the respective op-amps U4 and U5 connected as shown in FIG. 2, including the grounding connections. The controller 118 can be a proportional integral (PI) controller, including the resistors R1, R2, R4, R5, R6, R7, the capacitors C1 and C3, the op-amp U1, and the grounding connections as shown in FIG. 2.

Figure 3:
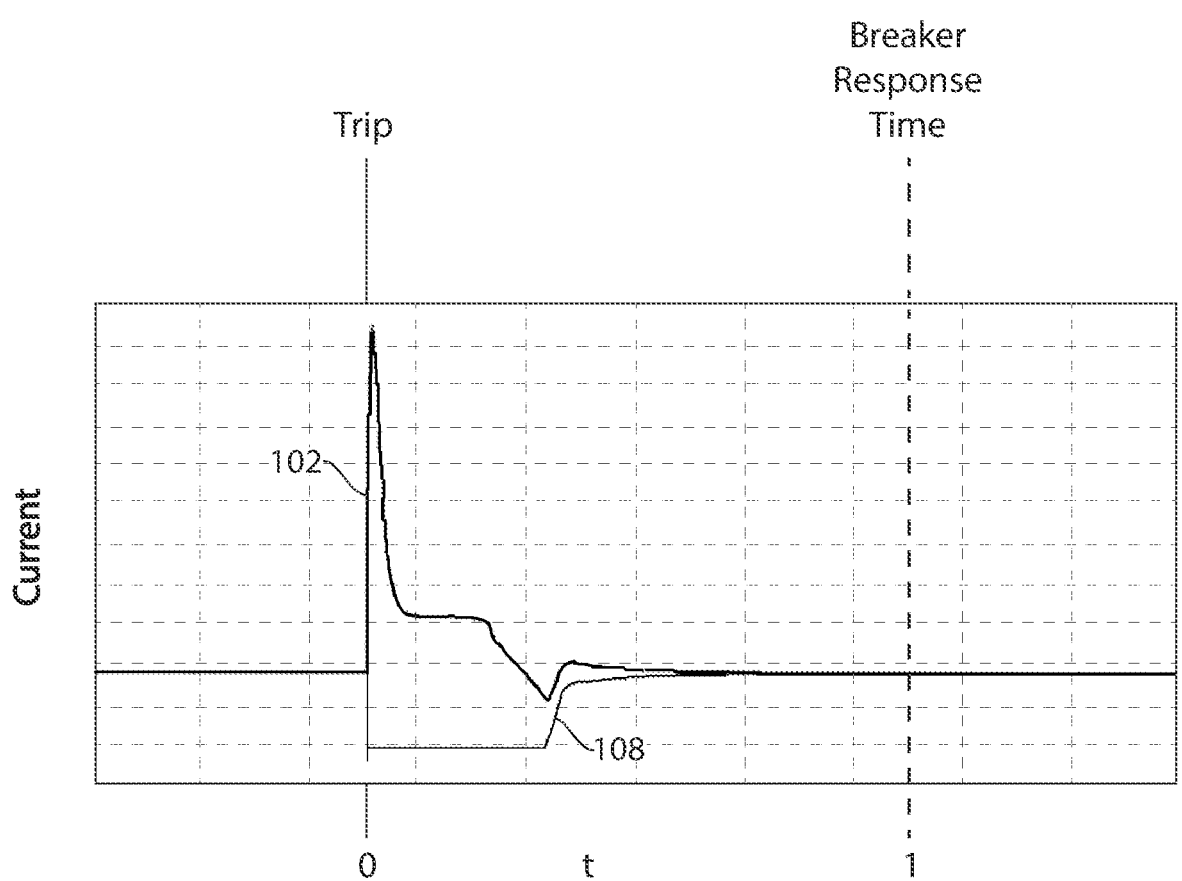
FIG. 3 is an example of a time response plot of the system of FIG. 1, showing response to a step change in one voltage source.
Figure 4:
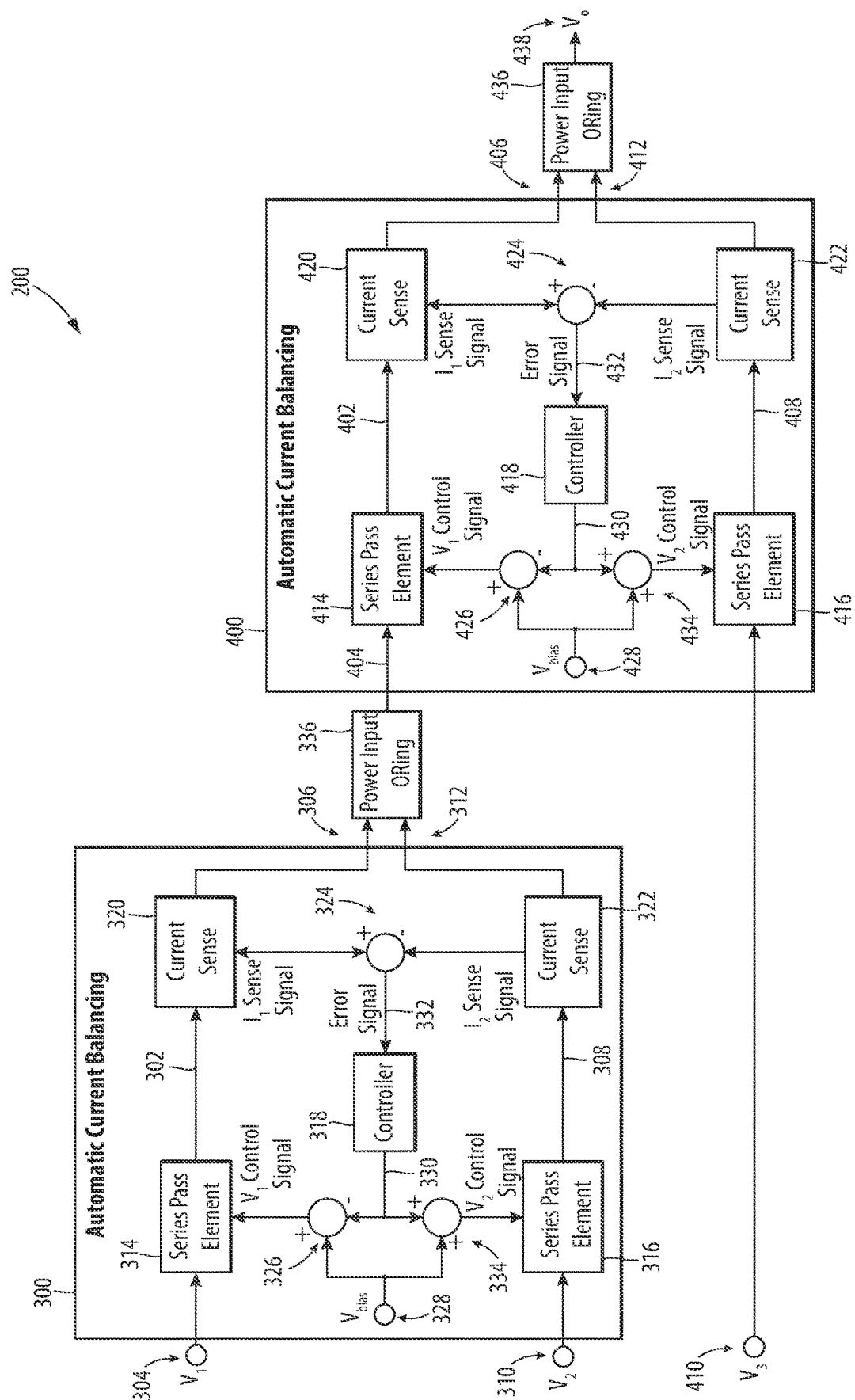
FIG. 4 is a schematic view of an embodiment of another system constructed in accordance with the present disclosure, showing two current balancers having an odd number of input lines.
Figure 5:
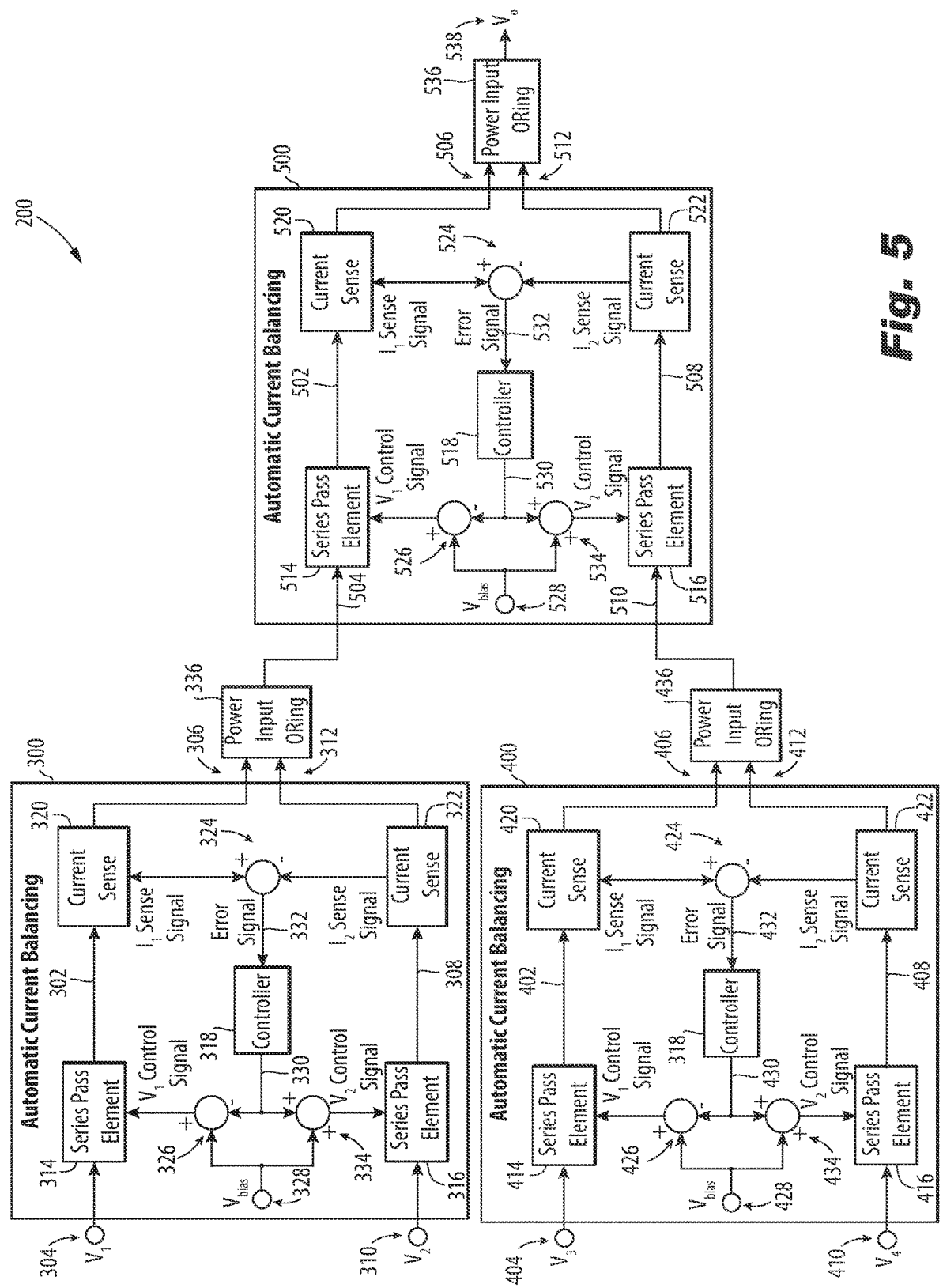
FIG. 5 is a schematic view of an embodiment of another system constructed in accordance with the present disclosure, showing three current balancers having an even number of input lines.

A method includes balancing output current between a first input line (e.g. line 102) and a second input line (e.g., line 108). Balancing output current includes throttling current in at least one of a first series pass element (e.g. series pass element 114) and second series pass element (e.g. series pass element 116) connected in series with the first input line and the second input line, respectively. This method is capable of balancing current for typical 28 VDC avionics applications or any other voltage suitable for other avionics applications (e.g. 12 VDC applications as well as others). As shown in FIG. 3, balancing output current can be performed within a response time configured to avoid tripping a breaker, i.e. after a step event (the event at the time labeled "Trip" in FIG. 3), the current in the first and second lines 102, 108 is re-balanced before the time when the associated breaker would trip (the time labeled "Breaker Response Time" in FIG. 3).

In embodiments, the system 200 can comprise a first current balancer 300 and a second current balancer 400. Each of the first and second current balancers 300, 400 can be automatic current balancers, and can include a first input line 302, 402 for a first voltage source 304, 404 connected to a first output 306, 406; a second input line 308, 408 for a second voltage source 310, 410 connected to a second output 312, 412 and is in parallel with the first input line 302, 402. A first series pass element 314, 414 can be connected in series with the first input line 302, 402, and a second series pass element 316, 416 can be connected in series with the second input line 312, 412. A controller 318, 418 can be operatively connected to the first series pass element 314, 414 and to the second series pass element 316, 416 to throttle at least one of the first series pass element 314, 414 and/or the second series pass element 316, 416 to balance output current in the first and second outputs 306, 406, 312, 412. The outputs 306, 312 of the first current balancer 300 are both connected to the first input line 402 of the second current balancer 400 for balancing the first and second input lines 302, 308 of the first current balancer 300 with the second input line 408 of the second current balancer 400.

The system 200 can include a third current balancer 500 which can also include a first input line 502 for a first voltage source 504 connected to a first output 506, a second input line 508 for a second voltage source 510 connected to a second output 512 and in parallel with the first input line 502. A first series pass element 514 can be connected in series with the first input line 502, and a second series pass element 516 can be connected in series with the second input line 508.

The third current balancer 500 can include a controller 518 operatively connected to the first series pass element 514 and to the second series pass element 516 to throttle at least one of the first series pass element 514 and/or the second series pass element 516 to balance output current in the first and second outputs 506, 512. The outputs 506, 512 of the third current balancer 500 can be both connected to the second input line 408 of the second current balancer 400 for balancing the first and second input lines 302, 308 of the first current balancer 300 with the first and second input lines 502, 508 of the third current balancer 500.

A first current sensor 320, 420, 520 can be connected in series in the first input line 302, 402, 502 between the first series pass element 314, 414, 514 and the first output 306, 406, 506. The first current sensor 320, 420, 520 can be operatively connected to the controller 318, 418, 518 to provide feedback to the controller 318, 418, 518 regarding current measured in the first input line 302, 402, 502. A second current sensor 322, 422, 522 can be connected in series in the second input line 308, 408, 508 between the second series pass element 316, 416, 516 and the second output 312, 412, 512. The second current sensor 322, 422, 522 can be operatively connected to the controller 318, 418, 518 to provide feedback to the controller 318, 418, 518 regarding current in the second input line 308, 408, 508.

A difference amplifier 326, 426, 526 can be connected to receive input from each of the first and second current sensors 320, 420, 520, 322, 422, 522, and connected to provide an output to the controller 318, 418, 518 that is proportional to difference in current between the first and second current sensors 320, 420, 520, 322, 422, 522. Additionally, or alternatively, the difference amplifier 326, 426, 526 can be connected between the controller 318, 418, 518 and the first series pass element 314, 414, 514 for controlling the first series pass element 314, 414, 514. For example, the difference amplifier 326, 426, 526 can be connected to a bias voltage 328, 428, 528 so that the difference amplifier 326, 426, 526 can compare between the output of the controller 318, 418, 518 and the bias voltage 328, 428, 528 to control the first series pass element 314, 414, 514.

A summing amplifier 334, 434, 534 can be connected between the controller 318, 418, 518 and the second series pass element 316, 416, 516 for controlling the second series pass element 316, 416, 516. The summing amplifier 334, 434, 534 can be connected to the bias voltage 328, 428, 528 so that the summing amplifier 334, 434, 534 can compare between the output of the controller 318, 418, 518 and the bias voltage 328, 428, 528 to control the second series pass element 316, 416, 516.

As described above and as shown in FIG. 2 with respect to the system 100, the diode or-ing 336, 436, 536 can be operatively connected to each of the first and second outputs 306, 406, 506, 312, 412, 512 and configured to output a single voltage 338, 438, 538 from the first and second input lines 302, 402, 502, 308, 408, 508. The diode or-ing 336, 436, 536 can have a first Schottky diode D1 connected to the first output 306, 406, 506 and a second Schottky diode D2 connected to the second output 312, 412, 512. At least one of the current balancers 300, 400, 500 and each of the first and second series pass elements 314, 414, 514, 316, 416, 516 can include a respective p-channel MOSFET M1, M2 as a primary pass element. In at least one of the current balancers the controller can be a proportional integral (PI) controller.

The first and second current balancers 300, 400 described above can be two current balancers in a plurality of current balancers, for example the system can include any number of tiers of current balancers. Each current balancer in the plurality of current balancers can include a first input line, a second input line, a first series pass element, a second series pass element, and a controller, as described herein with respect to current balancers 300, 400, 400. Here, the controller can throttle at least one of the first series pass element and/or the second series pass element to balance output current in the first and second outputs. The plurality of current balancers can be connected together in a cascade to balance the first input lines of a sub-plurality of the plurality of current balancers.

Figure 6:
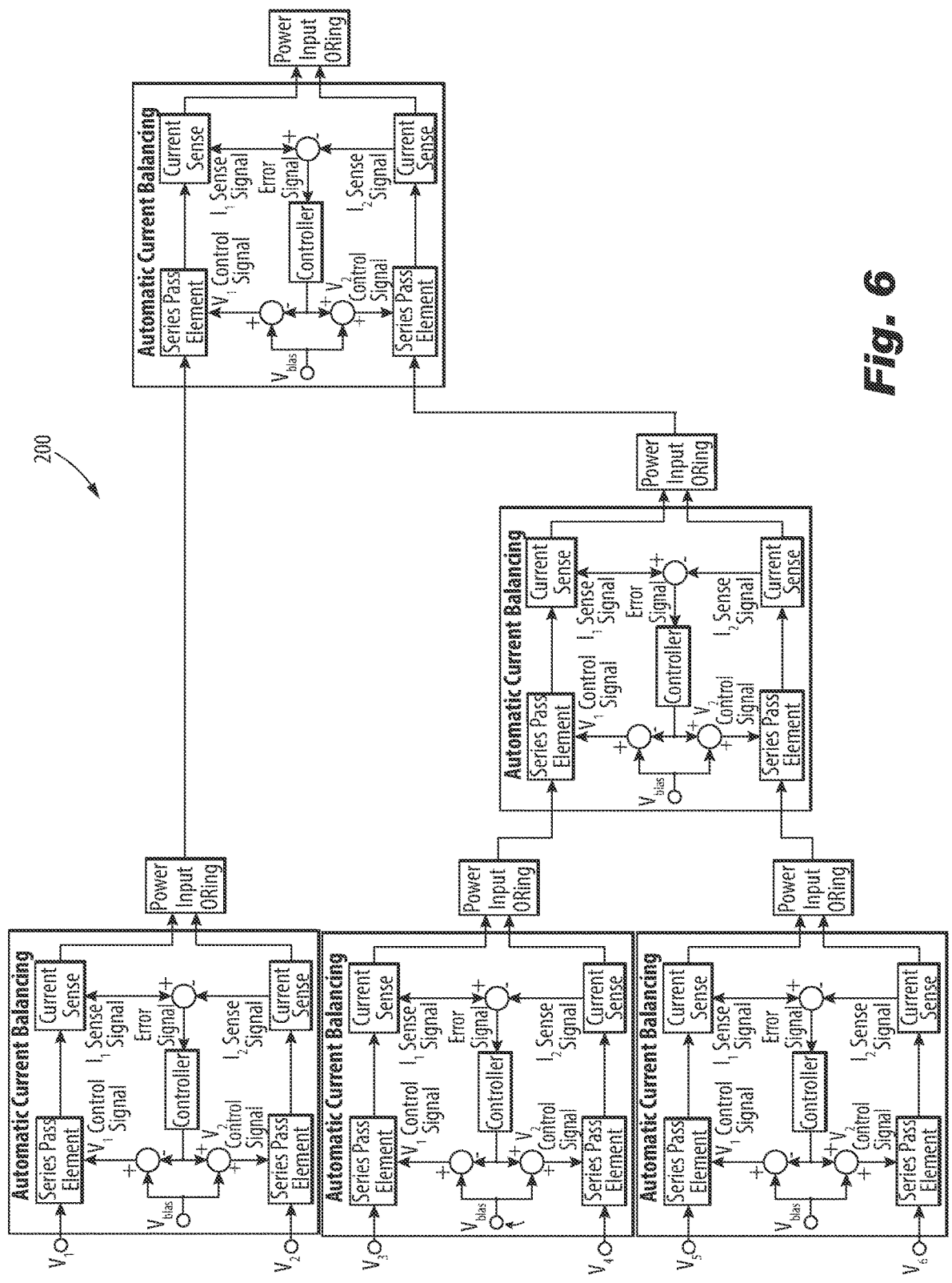
FIG. 6 is a schematic view of an embodiment of another system constructed in accordance with the present disclosure, showing a plurality of tiered current balancers having an even number of input lines.
Figure 7:
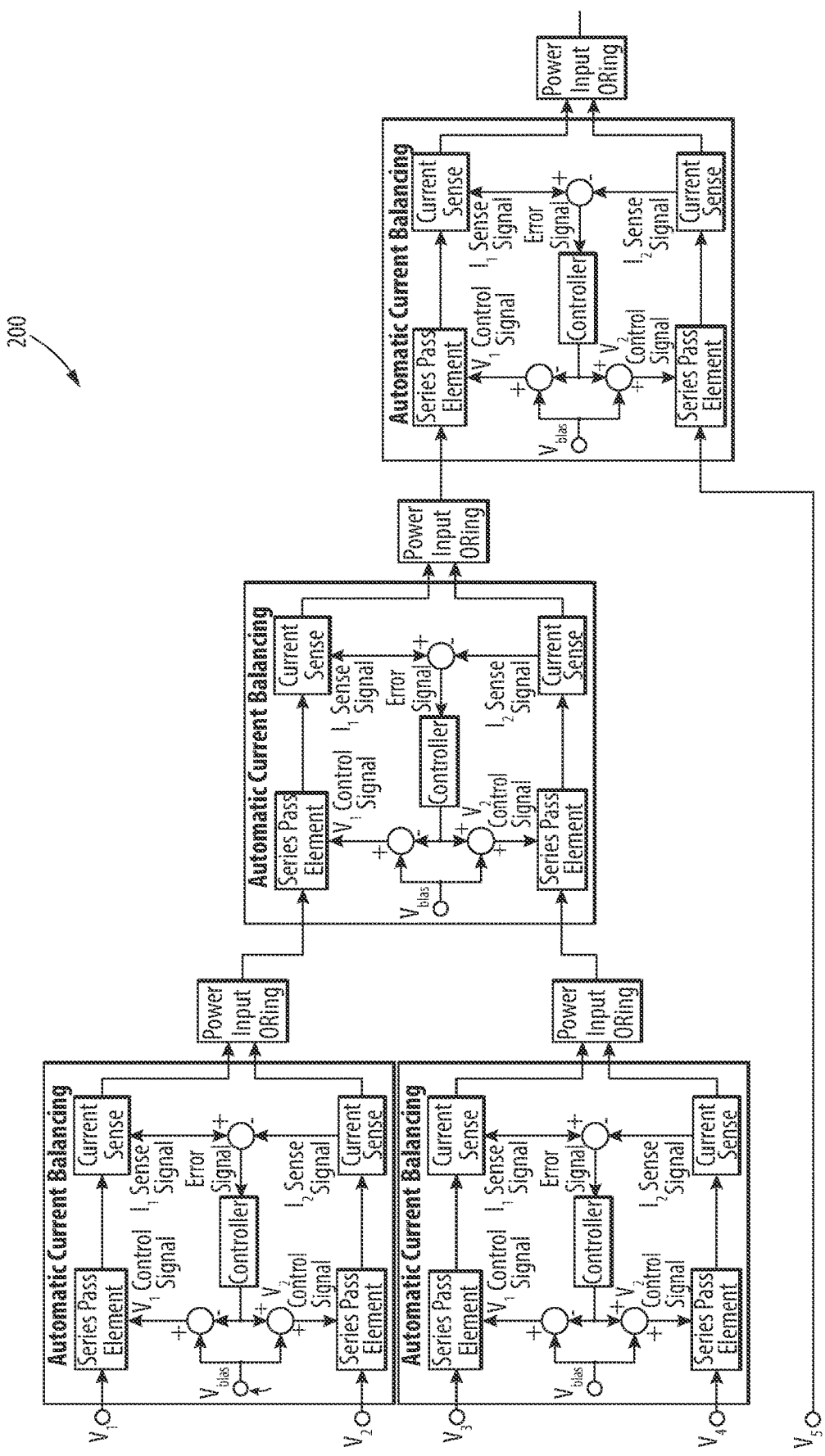
FIG. 7 is a schematic view of an embodiment of another system constructed in accordance with the present disclosure, showing a plurality of tiered current balancers having an odd number of input lines.

As shown in the tiered system 200 in FIG. 6 the system includes three tiers of current balancers having an even number of input lines, or as shown in FIG. 7, the system can include three tiers of current balancers, where the system includes an odd number of input lines. It is contemplated that when the system includes an odd number of current balancers, the system can have an even number of input lines balanced onto a single output, and when the system includes an even number of current balancers, the system can have an odd number of input lines balanced onto a single output. However, it is possible that an even number of current balancers can have an even number of input lines, and an odd number of current balancers can have an odd number of input lines.

A method can include balancing an output current between at least a first input line (e.g. input lines 302, 402, 502), a second input line (e.g. input lines 308, 408, 508), and a third input line. Balancing output current can include throttling current in at least one of a first series pass element 314, 414, 514, second series pass element 316, 416, 516, and/or a third series pass element connected in series with the first input line, the second input line, and third input line, respectively. Balancing output current can be performed within a response time configured to avoid tripping a breaker. The method can also include maintaining the output current at 28 VDC. Additional practical considerations can be aimed at limiting the maximum power dissipation in the series pass elements 114, 314, 414, 514, 116, 316, 416, 516. This could take a number of forms, including but not limited to:

1) measuring the voltage differential between the two voltage sources 104, 304, 404, 504, 110, 310, 410, 510 and locking out operation of the circuitry when said differential exceeds a certain threshold;

2) measuring the minimum voltage of the two voltage sources 104, 304, 404, 504, 110, 310, 410, 510 and locking out operation of the circuitry when said voltage drops below a certain threshold; and 3) measuring the die or package temperature of the series pass elements 114, 314, 414, 514, 116, 316, 416, 516 and locking out operation of the circuitry when said temperature exceeds a certain threshold.

The methods and systems of the present disclosure, as described above and shown in the drawings, provide for automatic current balancing, e.g. for 28 VDC avionics applications. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a first current balancer; and
a second current balancer, wherein each of the first and second current balancers includes:
    a first input line for a first voltage source, wherein the first input line is connected to a first output;
    a second input line for a second voltage source, wherein the second input line is connected to a second output and is in parallel with the first input line;
    a first series pass element connected in series with the first input line;
    a second series pass element connected in series with the second input line; and
    a controller operatively connected to the first series pass element and to the second series pass element to throttle at least one of the first series pass element and the second series pass element to balance output current in the first and second outputs;
wherein the outputs of the first current balancer are both connected to the first input line of the second current balancer for balancing the first and second input lines of the first current balancer with the second input line of the second current balancer.

2. The system as recited in claim 1, further comprising a third current balancer, wherein the third current balancer also includes:
    a first input line for a first voltage source, wherein the first input line is connected to a first output;
    a second input line for a second voltage source, wherein the second input line is connected to a second output and is in parallel with the first input line;
    a first series pass element connected in series with the first input line;
    a second series pass element connected in series with the second input line; and
    a controller operatively connected to the first series pass element and to the second series pass element to throttle at least one of the first series pass element and the second series pass element to balance output current in the first and second outputs;
    wherein the outputs of the third current balancer are both connected to the second input line of the second current balancer for balancing the first and second input lines of the first current balancer with the first and second input lines of the third current balancer.

3. The system as recited in claim 1, wherein first and second current balancers are two in a plurality of current balancers, wherein each current balancer in the plurality of current balancers includes:
    a first input line for a first voltage source, wherein the first input line is connected to a first output;
    a second input line for a second voltage source, wherein the second input line is connected to a second output and is in parallel with the first input line;
    a first series pass element connected in series with the first input line;
    a second series pass element connected in series with the second input line; and
    a controller operatively connected to the first series pass element and to the second series pass element to throttle at least one of the first series pass element and the second series pass element to balance output current in the first and second outputs;

wherein the plurality of current balancers are connected together in a cascade to balance the first input lines of a sub-plurality of the plurality of current balancers.

4. The system as recited in claim 3, wherein there is an even number of input lines balanced onto a single output.

5. The system as recited in claim 4, wherein there is an odd number of current balancers.

6. The system as recited in claim 3, wherein there is an odd number of input lines balanced onto a single output, and wherein there is an even number of current balancers.

7. The system as recited in claim 3, wherein at least one of the current balancers further comprises a first current sensor connected in series in the first input line between the first series pass element and the first output, wherein the first current sensor is operatively connected to the controller to provide feedback to the controller regarding current measured in the first input line.

8. The system as recited in claim 3, wherein at least one of the current balancers further comprises a second current sensor connected in series in the second input line between the second series pass element and the second output, wherein the second current sensor is operatively connected to the controller to provide feedback to the controller regarding current in the second input line.

9. The system as recited in claim 8, wherein at least one of the current balancers further comprises a difference amplifier connected to receive input from each of the first and second current sensors, and connected to provide an output to the controller that is proportional to difference in current between the first and second current sensors.

10. The system as recited in claim 4, wherein at least one of the current balancers further comprises a difference amplifier connected between the controller and the first series pass element for controlling the first series pass element.

11. The system as recited in claim 10, wherein the difference amplifier is connected to a bias voltage so the difference amplifier can compare between the output of the controller and the bias voltage to control the first series pass element.

12. The system as recited in claim 4, wherein at least one of the current balancers further comprises a summing amplifier connected between the controller and the second series pass element for controlling the second series pass element.

13. The system as recited in claim 12, wherein the summing amplifier is connected to a bias voltage so the summing amplifier can compare between the output of the controller and the bias voltage to control the second series pass element.

14. The system as recited in claim 4, wherein at least one of the current balancers further comprises a diode or-ing operatively connected to each of the first and second outputs and configured to output a single voltage from the first and second input lines.

15. The system as recited in claim 14, wherein the diode or-ing includes a first Schottky diode connected to the first output and a second Schottky diode connected to the second output.

16. The system as recited in claim 4, wherein in at least one of the current balancers, each of the first and second series pass elements includes a respective p-channel MOSFET as a primary pass element.

17. The system as recited in claim 4, wherein in at least one of the current balancers, the controller is a proportional integral (PI) controller.

18. A method comprising:

balancing an output current between at least a first input line, a second input line, and a third input line, wherein balancing output current includes throttling current in at least one of a first series pass element, second series pass element, and a third series pass element connected in series with the first input line, the second input line, and third input line, respectively.

19. The method as recited in claim 18, wherein balancing output current is performed within a response time configured to avoid tripping a breaker.

20. The method as recited in claim 18, further comprising maintaining the output current at 28 VDC.

* * * * *